(12) United States Patent
Vora (10) Patent No.: US 11,105,982 B2
(45) Date of Patent: Aug. 31, 2021

(54) IMAGEABLE OVERCOAT FOR AN OPTICAL WAVEGUIDE AND PROCESS FOR MAKING THE SAME

(71) Applicant: Facebook Technologies, LLC, Menlo Park, CA (US)

(72) Inventor: Ankit Vora, Bothell, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/542,840

(22) Filed: Aug. 16, 2019

(65) Prior Publication Data

US 2020/0379184 A1 Dec. 3, 2020

Related U.S. Application Data

(60) Provisional application No. 62/854,895, filed on May 30, 2019.

(51) Int. Cl.
*G02B 6/34* (2006.01)
*F21V 8/00* (2006.01)
*G02B 6/00* (2006.01)

(52) U.S. Cl.
CPC .............. *G02B 6/34* (2013.01); *G02B 6/00* (2013.01); *G02B 6/0038* (2013.01)

(58) Field of Classification Search
CPC .... G02B 6/02066; G02B 6/34; G02B 5/1819; G02B 5/1857; G02B 27/0172; G02B 27/4272
See application file for complete search history.

(56) References Cited

U.S. PATENT DOCUMENTS

| 5,436,991 | A | * | 7/1995 | Sunagawa | G02B 6/124 |
| | | | | | 359/569 |
| 7,181,108 | B2 | * | 2/2007 | Levola | G02B 6/105 |
| | | | | | 385/11 |
| 9,519,089 | B1 | * | 12/2016 | Brown | G02B 27/0172 |
| 9,885,870 | B2 | * | 2/2018 | Stenberg | G02B 6/0016 |
| 10,222,615 | B2 | * | 3/2019 | Lowney | G02B 27/0101 |
| 10,409,001 | B2 | * | 9/2019 | Young | G02B 27/0172 |

(Continued)

FOREIGN PATENT DOCUMENTS

GB 2521535 6/2015

OTHER PUBLICATIONS

PCT/US2020/033070 Search Report dated Aug. 21, 2020.

*Primary Examiner* — Daniel Petkovsek
(74) *Attorney, Agent, or Firm* — Pequignot + Myers; Matthew A. Pequignot (57) ABSTRACT

An imaging waveguide for a visual display includes a substrate for guiding image light therein by total internal reflection (TIR). An input grating is supported by the substrate for coupling the image light into the imaging waveguide. An output grating is supported by the substrate and spaced apart from the input grating for coupling the image light guided in the substrate out of the imaging waveguide for observation by a user. A gap filling overcoat is formed on and within the output grating, but not on or within the input grating. The material is characterized by a refractive index between 1.40 and 1.80 at 500 nm, absorption between 0% and 1% in the visible region of the electromagnetic spectrum, and % haze between 0% and 0.2% in the visible region of the electromagnetic spectrum.

19 Claims, 7 Drawing Sheets

(56) References Cited

U.S. PATENT DOCUMENTS

| | | |
|---|---|---|
| 10,690,831 B2 * | 6/2020 | Calafiore .............. G02B 6/0046 |
| 10,761,256 B2 * | 9/2020 | Dubinin ................ G02B 5/0252 |
| 10,768,348 B2 * | 9/2020 | Valera ....................... G02B 6/34 |
| 2017/0307886 A1 * | 10/2017 | Stenberg .............. G02B 5/1814 |
| 2017/0307887 A1 * | 10/2017 | Stenberg ............ G02F 1/133504 |
| 2017/0315346 A1 | 11/2017 | Tervo et al. |
| 2019/0056591 A1 | 2/2019 | Tervo et al. |
| 2019/0072767 A1 | 3/2019 | Vallius et al. |

\* cited by examiner

Formula I

Formula II

Formula III

Formula IV

IMAGEABLE OVERCOAT FOR AN OPTICAL WAVEGUIDE AND PROCESS FOR MAKING THE SAME

REFERENCE TO RELATED APPLICATION

The present application claims priority from U.S. Provisional Application No. 62/854,895 entitled "Imageable Overcoat for an Optical Waveguide and Process for Making the Same", filed on May 30, 2019, and incorporated herein by reference in its entirety.

FIELD

The present disclosure relates generally to optical waveguides, particularly but not exclusively for use in waveguide-based imaging systems, such as for example head-up displays, head-mounted displays, helmet mounted displays and other projection displays. More particularly the present disclosure relates to imageable overcoats for such optical waveguides and processes for making the same.

BACKGROUND

Head mounted displays (HMD) or helmet mounted displays and the like are being used increasingly for displaying virtual reality (VR) and augmented reality (AR) content, and they are finding applications in diverse fields including entertainment, education, training and biomedical science to name just a few examples. In VR applications the user is completely immersed in a digital environment that is displayed via the HMD or another type of projection display. On the other hand, AR applications can be seen as a half reality which overlays virtual computer-generated perceptual items and features into a real-world environment. Mixed reality (MR) systems are a type of AR system which also introduce simulated objects into a real-world environment, but these objects typically feature a greater degree of interactivity and the simulated elements can even be interactive in real time.

AR/MR systems require more components and tend to be more complex compared to their VR counterparts. Further, in order to implement the computer-generated items mixed with the real-world environment, it is necessary to design the optical system considering the pupil size, virtual image, optical distance to the eye (eye relief), image magnification, and field of view. Since overall size and weight are important considerations in HMD or helmet mounted displays, which may be worn by the user for hours at a time, many systems employ waveguide structures instead of bulkier and/or heavier components such as mirrors, beam splitters, etc. In particular, diffractive waveguides are widely used in see-through AR/MR displays that are currently on the market. In such systems the incident light waves flow into the waveguide with a certain angle by collimating by the first slanted gratings, in-coupler, pass through the waveguide and are extracted to the exit pupil via the second slanted gratings, out-coupler.

Unfortunately, the performance of the gratings may be affected by environmental conditions, such as for instance variations in humidity, greasy or oily deposits, dust and other particulate contaminants, etc. Further, the gratings are highly susceptible to physical damage because of the very small dimensions of the ridges. To protect the ridges, the gratings may be overcoated with a polymer coating. Overcoat protection improves optical throughput and uniformity of the gratings, as well as reduces colored reflections of external light into the user's field of view. Such colored reflections are termed "rainbow effects".

It would therefore be beneficial to provide waveguide assemblies and processes for making the same, which overcome at least some of the above-mentioned disadvantages and/or limitations.

SUMMARY

In accordance with an aspect of at least one embodiment, there is provided an imaging waveguide comprising: a substrate for guiding image light therein by total internal reflection (TIR); an input grating supported by the substrate for coupling the image light into the imaging waveguide; an output grating supported by the substrate and spaced apart from the input grating for coupling the image light guided in the substrate out of the imaging waveguide for observation by a user; and a gap filling overcoat formed on and within the output grating but not on or within the input grating.

In accordance with an aspect of at least one embodiment, there is provided process for forming an imaging waveguide for a visual display, comprising: providing a substrate for guiding image light therein by total internal reflection (TIR), the substrate having an input grating supported thereby for coupling the image light into the imaging waveguide and having an output grating supported thereby and spaced apart from the input grating for coupling the image light guided in the substrate out of the imaging waveguide for observation by a user; forming a layer of an overcoat precursor material on top of and within the output grating and on top of and within the input grating, the overcoat precursor material being a cross-linkable material; selectively inducing cross-linking in the overcoat precursor material disposed on top of and within the output grating to produce a cross-linked material, but not the overcoat precursor material disposed on top of and within the input grating; and removing overcoat precursor material other than the cross-linked material.

In accordance with an aspect of at least one embodiment, there is provided a surface-relief diffraction grating assembly for supporting viewing of external objects therethrough and for supporting image display therefrom, wherein the surface-relief diffraction grating assembly comprises a substrate and, bound to the substrate, a photoresist surface-relief diffraction input grating, a photoresist surface-relief diffraction output grating, and a waveguide for propagating light between the input grating and the output grating within a light propagation plane, wherein an overcoat is formed on the output grating but not on the input grating, the overcoat formed from a material having a refractive index between 1.40 and 1.80 at 500 nm, absorption between 0% and 1% in the visible region of the electromagnetic spectrum, and % haze between 0% and 0.2% in the visible region of the electromagnetic spectrum, and the output grating at least partially transparent to light along a first direction transverse to the light propagation plane.

BRIEF DESCRIPTION OF THE DRAWINGS

The instant disclosure will now be described by way of example only, and with reference to the attached drawings, in which.

DETAILED DESCRIPTION

The following description is presented to enable a person skilled in the art to make and use the disclosure and is provided in the context of a particular application and its requirements. Various modifications to the disclosed embodiments will be readily apparent to those skilled in the art, and the general principles defined herein may be applied to other embodiments and applications without departing from the scope of the disclosure. Thus, the present disclosure is not intended to be limited to the embodiments disclosed but is to be accorded the widest scope consistent with the principles and features disclosed herein. Similar reference numerals denote similar elements.

Figure 1A:
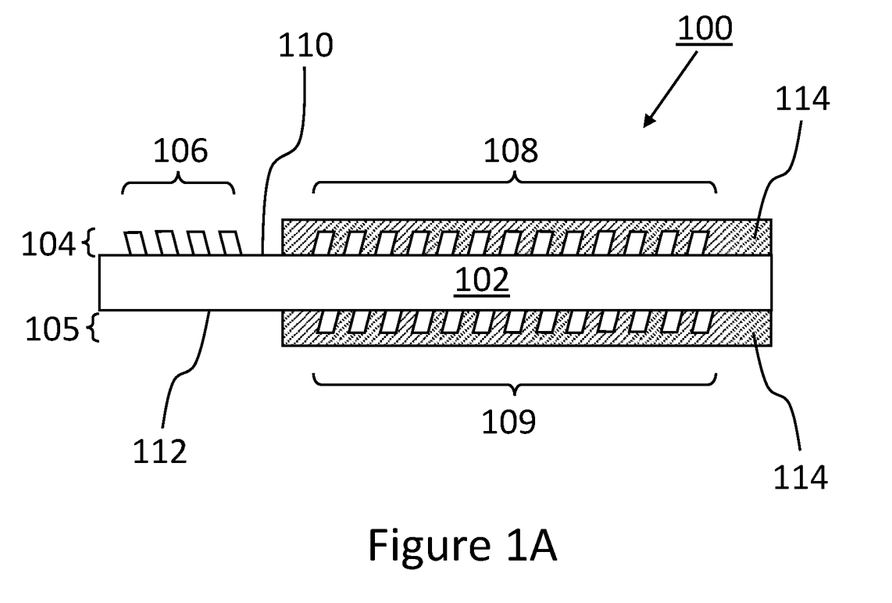
FIG. 1A is a simplified diagram showing a waveguide structure with an overcoat according to an embodiment.

Referring now to FIG. 1A, shown is a simplified diagram of an optical component, specifically an imaging waveguide, in the form of a surface-relief diffraction grating assembly 100 according to an embodiment. The grating assembly 100 includes a substrate 102, a first grating forming layer 104 containing a first diffractive optical element 106 (input grating) and a second diffractive optical element 108 (output grating for out-coupling the image light), and optionally a second grating forming layer 105 containing a third diffractive optical element 109 (second grating for redirecting the image light). Substrate 102 has a first substantially planar surface 110 and a second substantially planar surface 112, which is substantially parallel to the first planar surface 110. Substrate 102 is waveguiding, which means that light impinging on first diffractive optical element 106 may be in-coupled and propagate within substrate 102 towards the second diffractive optical element 108 and the third diffractive optical element 109, such that said propagating light may be confined within substrate 102 by total internal reflections (TIR). Slanted gratings of the type that are shown in FIG. 1A may be used for coupling light into optical waveguides due to their high efficiency in a certain diffraction order. In some embodiments, the first diffractive optical element 106, the second diffractive optical element 108, and the third diffractive optical element may be formed directly in the material of the substrate 102.

The grating assembly 100 further includes a layer of an overcoat material 114, which is disposed on top of and within the grooves of the second diffractive optical element 108 and third diffractive optical element 109. However, the layer of overcoat material 114 is not disposed on top of or within the grooves of the first diffractive optical element 106 (input grating). Various classes of organic, inorganic and hybrid organic/inorganic materials may be used to form the layer of an overcoat material 114 in the waveguide assembly that is shown in FIG. 1A.

Figure 1B:
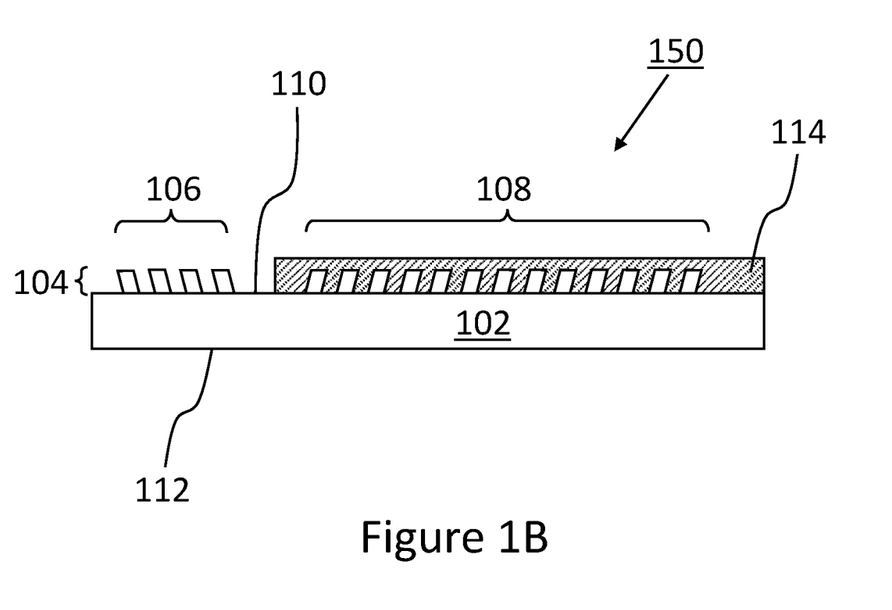
FIG. 1B is a simplified diagram showing another waveguide structure with an overcoat according to an embodiment.

Referring now to FIG. 1B, shown is a simplified diagram of another optical component, specifically an imaging waveguide, in the form of a surface-relief diffraction grating assembly 150 according to an embodiment. The grating assembly 150 includes a substrate 102, a grating forming layer 104 containing a first diffractive optical element 106 (input grating) and a second diffractive optical element 108 (output grating). Substrate 102 has a first substantially planar surface 110 and a second substantially planar surface 112, which is substantially parallel to the first planar surface 110. Substrate 102 is waveguiding, which means that light impinging on first diffractive optical element 106 may be in-coupled and propagate within substrate 102 towards the second diffractive optical element 108, such that said propagating light may be confined within substrate 102 by total internal reflections (TIR). Slanted gratings of the type that are shown in FIG. 1B may be used for coupling light into optical waveguides due to their high efficiency in a certain diffraction order. In some embodiments, the first diffractive optical element 106 and the second diffractive optical element 108 may be formed directly in the material of the substrate 102.

The grating assembly 150 further includes a layer of an overcoat material 114, which is disposed on top of and within the grooves of the second diffractive optical element 108. However, the layer of overcoat material 114 is not disposed on top of or within the grooves of the first diffractive optical element 106 (input grating). Various classes of organic, inorganic and hybrid organic/inorganic materials may be used to form the layer of an overcoat material 114 in the waveguide assembly that is shown in FIG. 1B.

In the specific examples that are illustrated in FIG. 1A and FIG. 1B, substrate 102 is a plano-parallel substrate. Optionally, the substrate of the optical component has other than a plano-parallel geometry, such as for instance the substrate is curved or flexible.

Selection of a specific overcoat precursor material to be used for forming the overcoat layer in the waveguide assemblies that are shown in FIG. 1A and FIG. 1B, from among the available compounds within the various possible classes of materials, should take into account a number of characteristics, which determine whether or not a specific overcoat precursor material is capable of forming an overcoat layer with desired characteristics for a particular application. More particularly, the selection of a specific overcoat precursor material should take into account at least the following characteristics.

(i) Cross-linkable—The overcoat precursor material should be cross-linkable. In general, cross-linking is the process of chemically joining two or more molecules by a covalent bond, initiated by irradiation, heat, pressure or pH change etc., in a suitable solvent. The cross-linked material becomes insoluble in the solvent and is also is typically resistant to other solvents that may be used in subsequent steps.

(ii) Good gap-fill properties—The overcoat precursor material should also fill the spaces completely within the surface relief grating structures (i.e., the grooves between the ridges). In the specific examples shown in FIG. 1A and FIG. 1B the gratings are slanted gratings with an aspect ratio as high as 10:1 and may have a smallest feature size as small as about 30 nm. The overcoat precursor material should not leave unfilled void spaces within the grooves of the grating structures, so as to ensure that the final overcoat layer does not contain any such undesirable void spaces. The gap-fill properties of a material are determined at least partially by the viscosity of the solution that is applied in an application step, as well as by surface energy properties and the method of application itself. For instance, if a substrate is very hydrophilic and the overcoat precursor material is very hydrophobic then there is a surface energy mismatch and the overcoat precursor material may not fill the grooves of the surface relief gratings very well.

(iii) Low haze—The overcoat material in the finished optical component should exhibit low haze in the visible region of the electromagnetic spectrum, e.g. between 400 nm and 700 nm. More particularly, the overcoat material should have less than 1% haze, preferably between 0% and 0.5% haze, and more preferably less than 0.2% haze, for a film thickness up to about 1 μm.

(iv) Low absorption—The overcoat material in the finished optical component should be optically clear in the visible region of the electromagnetic spectrum, e.g. between 400 nm and 700 nm. More particularly, the overcoat material should be characterized by between 0% and 1% absorption in the visible region, preferably between 0% and 0.5% absorption, and more preferably between 0% and 0.25% absorption in the visible region, for a film thickness up to about 1 μm.

(v) Thermal stability—The overcoat material in the finished optical component should be thermally stable to subsequent processing steps. For example, the overcoat material should be thermally stable at temperatures in the range between 25° C. and 200° C., and preferably between 25° C. and 250° C., for up to at least one hour.

(vi) Compatible etch chemistry—If any etch back is required to trim the thickness of the as-deposited overcoat material, then the etch chemistry should not damage the input grating, which does not have the overcoat material disposed on top thereof and is therefore exposed.

(vii) Refractive index (RI)—The RI of the overcoat material in the finished optical component is preferably within the range between 1.40 to 1.80 at 500 nm.

In addition to characteristics (i)-(vii) as discussed above, the top surface of the finished overcoat structure should have a high degree of planarization. That is to say, the top surface should be free of ripples and other irregularities. The degree of planarization that is achieved in the finished overcoat structure is primarily a function of the process that is used to deposit or apply the overcoat precursor material, rather than a property of the material itself. Normally, spin coating results in good planarization. As will be apparent, the layer of the overcoat material that is initially formed by spin coating may be thicker than the desired final thickness and may then be etched back down to the desired thickness in a controllable fashion resulting in good planarization. In contradistinction atomic layer deposition (ALD) is a very conformal technique and therefore the degree of planarization of the finished overcoat structure is potentially quite low, since any irregularities that are present on the substrate will result in ripples on the top surface.

Figure 2:
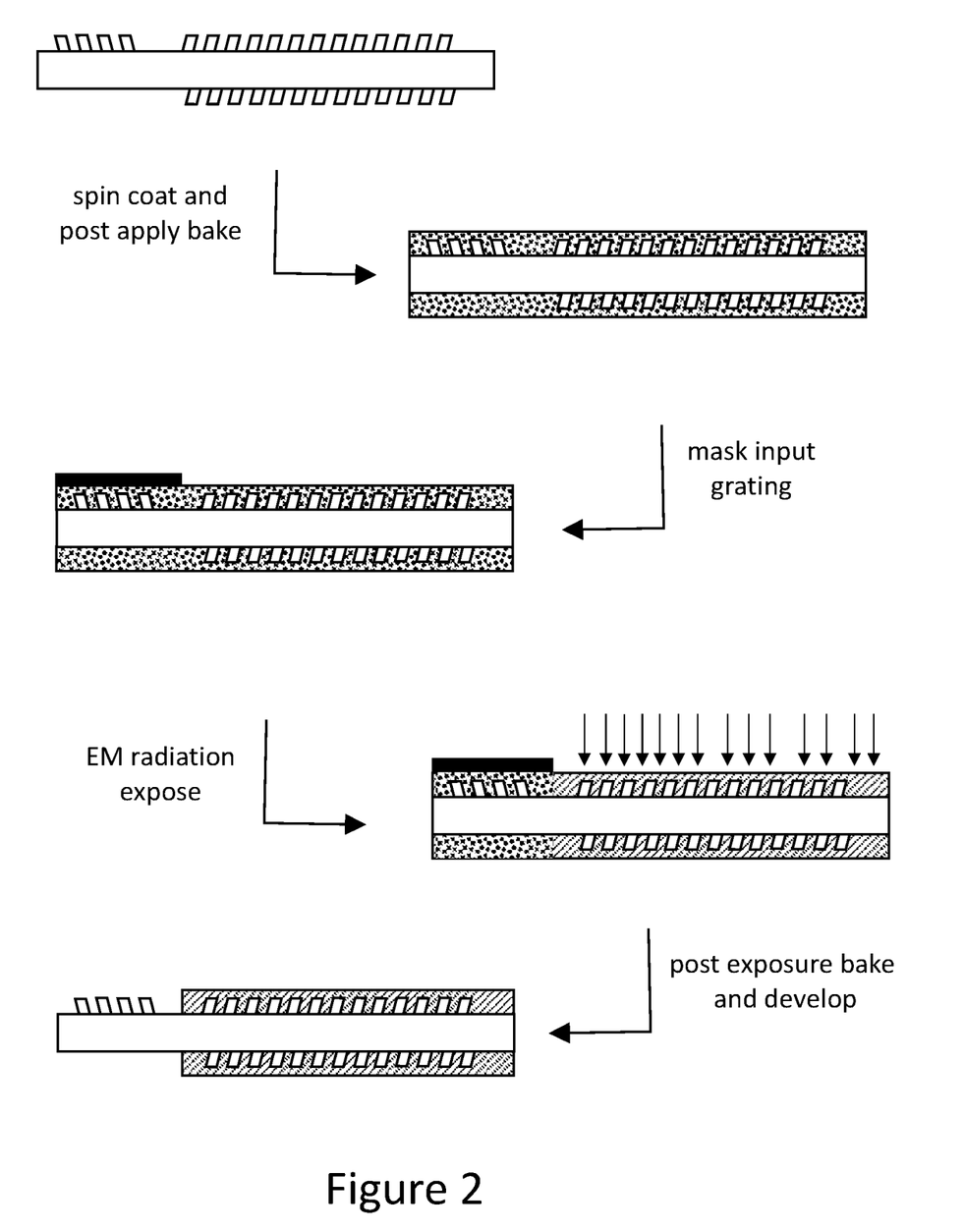
FIG. 2 illustrates the steps of a method according to an embodiment.

FIG. 2 illustrates the steps of an exemplary process for forming a surface-relief diffraction grating assembly as shown in FIG. 1A, with a layer of an overcoat material disposed on top of and within the grooves of an output grating and on top of and within the grooves of a second grating thereof. The same exemplary process is equally suitable for forming a surface-relief diffraction grating assembly as shown in FIG. 1B, with a layer of an overcoat material disposed on top of and within the grooves of an output grating thereof.

More particularly, the exemplary process is based on the spin coating technique. The first step of the process is providing an uncoated waveguide having surface relief input and output gratings. For instance, the surface relief input and output gratings are slanted gratings having an aspect ratio as high as about 10:1 and a smallest feature size of about 30 nm. In this specific example the second grating is supported by the substrate opposite the output grating.

Next, an overcoat formulation containing an overcoat precursor material is applied over the entire waveguide surface, and such that the overcoat precursor material fills the gaps between the ridges in the input and output gratings and the gaps between the ridges of the second grating, so as to form a layer on the substrate having a generally uniform initial thickness. Specific considerations or criteria for selecting a suitable overcoat precursor material have been discussed in detail above. In addition, several specific and non-limiting examples of preferred overcoat precursor materials are listed below, as well as several general classes of chemical compounds that may also be considered when selecting a suitable overcoat precursor material. The overcoat formulation includes, in addition to the overcoat precursor material, at least a solvent and an initiator such as for instance a photoacid generator (PAG). Optionally, the overcoat formulation includes additional compositions, such as for instance a composition selected to enhance cross-linking (e.g., a sensitizer) and/or to provide enhanced properties in the overcoat material.

In a specific and non-limiting example, the overcoat formulation is applied in a spin coating step and the overcoat precursor material is a material that has epoxide functional groups. Optionally, a post-apply (soft) bake is performed to evaporate the spin coat solvent. Further optionally, the layer thickness of the overcoat precursor material applied in this step may be greater than the desired final layer thickness. The as-applied coating may be etched back to provide the desired layer thickness and surface quality in a subsequent step.

In a next step a mask is applied over the input grating, and the masked assembly is irradiated with electromagnetic radiation within a particular wavelength range to initiate cross-linking of the overcoat precursor material. In an embodiment the electromagnetic radiation is within the ultraviolet (UV) region of the electromagnetic spectrum. For instance, as discussed above, the overcoat precursor material is spin coated in a solution that includes a photoacid generator (PAG), such as for instance triphenyl sulfonium triflate. Photoacids are molecules which become more acidic upon absorption of light having a specific wavelength, such as for instance by proton photodissociation. Upon irradiation, the PAG undergoes photodissociation and, in this specific and non-limiting example, opens an epoxide ring of the overcoat precursor material. The overcoat precursor material then begins cross-linking and forms the overcoat structure.

A post-exposure bake and develop step is then performed using a developer solution, which selectively removes the overcoat precursor material that was not exposed to the UV light due to the mask—specifically the precursor material on top of and within the grooves of the input grating. In contradistinction, the cross-linked material on top of and within the output grating and the cross-linked material on top of and within the second grating is not soluble in the developer solution and therefore it is not removed during this step.

The process that is discussed above uses spin coating to apply the overcoat precursor material onto the substrate. However, it is envisioned that other suitable application techniques may be used instead of spin coating. For instance, the overcoat precursor material may be selectively jetted onto and within the output grating and second grating, or the overcoat precursor material may be built up layer-by-layer on top of and within the output grating and the second grating using ALD. In general, the spin coating approach described with reference to FIG. 2 is preferred over ALD and other approaches because spin coating can be performed relatively quickly, achieves good gap fill results even in slant grating structures with an aspect ratio as high as at least about 10:1 and smallest feature sizes of about 30 nm, and also achieves good planarization. In contradistinction, ALD is time consuming and it is difficult to eliminate voids during the gap fill step, especially when the gratings are at high angle. Further, ALD tends to be very conformal, and therefore any irregularities on the substrate also appear as ripples on the top of the overcoat structure.

Referring now to FIGS. 3A-3D, shown are specific and non-limiting examples of compounds that are suitable for use as a precursor material for forming an overcoat layer in accordance with an embodiment.

Figure 3A:
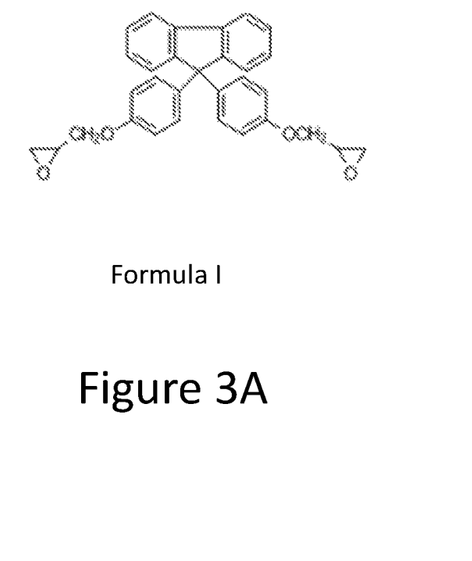
FIG. 3A shows the chemical structure (Formula I) of a first epoxide compound that is suitable for use as a cross-linker for forming an overcoat material precursor.
Figure 3B:
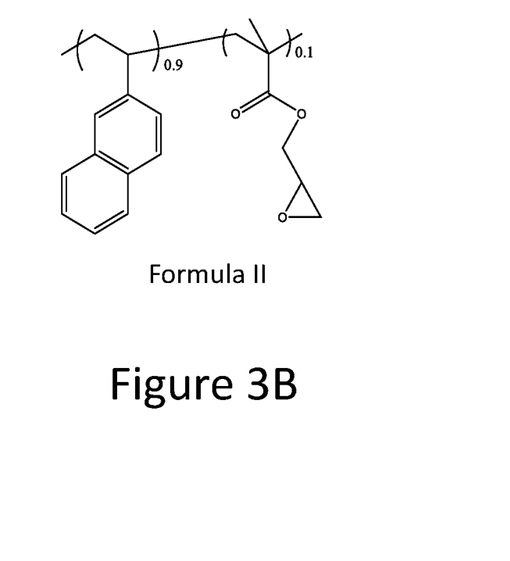
FIG. 3B shows the chemical structure (Formula II) of a second epoxide compound that is suitable for use as a cross-linker for forming an overcoat material precursor.

Formula I (9,9 bis(4-glycidyloxy phenyl) fluorene) and Formula II (poly(2-vinylnaphthalene-r-glycidyl methacrylate)) are specific examples of organic cross-linkable molecules, which have the chemical structures that are shown in FIG. 3A and FIG. 3B, respectively. Other examples of suitable cross-linkable molecules may be obtained by substituting at least some of the hydrogen groups in Formula I or II with aromatic, thioaromatic, aliphatic, clycloaliphatic, halogen, or thioaliphatic, heteroaromatic groups, or combinations thereof.

Figure 3C:
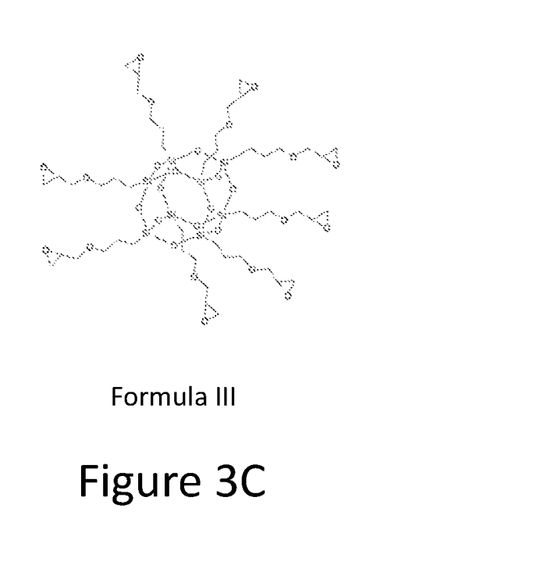
FIG. 3C shows the chemical structure (Formula III) of a third epoxide compound that is suitable for use as a cross-linker for forming an overcoat material precursor.
Figure 3D:
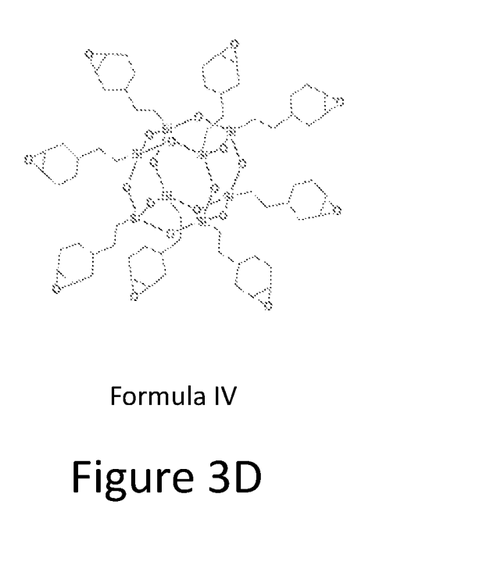
FIG. 3D shows the chemical structure (Formula IV) of a fourth epoxide compound that is suitable for use as a cross-linker for forming an overcoat material precursor.

Formula III (glycidyl polyhedral oligomeric silsesquioxane) and Formula IV (epoxycyclohexylethyl polysilsesquioxane) are specific examples of hybrid molecules, which have the chemical structures that are shown in FIG. 3C and FIG. 3D, respectively. Each of these compounds has the general structure:

which comprises an inorganic silsesquioxane at the core and organic R groups attached at the corners of the cage—where R is a glycidyl group in Formula III and R is an epoxycyclohexyl group in Formula IV. In the general structure shown above the cage of the inorganic silsesquioxane core has eight Si verticies, however compounds having six, ten or twelve Si verticies are also known and may be suitable candidates for the overcoat precursor material.

Cross-linking of compounds corresponding to Formula III or Formula IV, or another silsesquioxane material such as for instance poly methyl silsesquioxane (PMSG) or poly phenyl silsesquioxane (PPSQ), in the presence of a photoacid generator and after post exposure bake, presents advantages in that inorganic materials tend to be more thermally stable and less prone to yellowing. Of course, an organic material presenting similar thermal stability and resistance to yellowing may be equally suitable.

As discussed above, the refractive index of the overcoat material in the finished optical component is preferably within the range between 1.40 and 1.80 at 500 nm. As is shown in Table 1 below, the refractive index of overcoat layers fabricated from precursor materials having each of Formula I, II, III and IV falls within the preferred range.

TABLE 1

Refractive index of overcoat materials fabricated from precursor materials corresponding to Formulae I to IV.

| Precursor Material Formula # | Refractive index |
| --- | --- |
| I | 1.64 |
| II | 1.67 |
| III | 1.5 |
| IV | 1.52 |

Figure 4A:
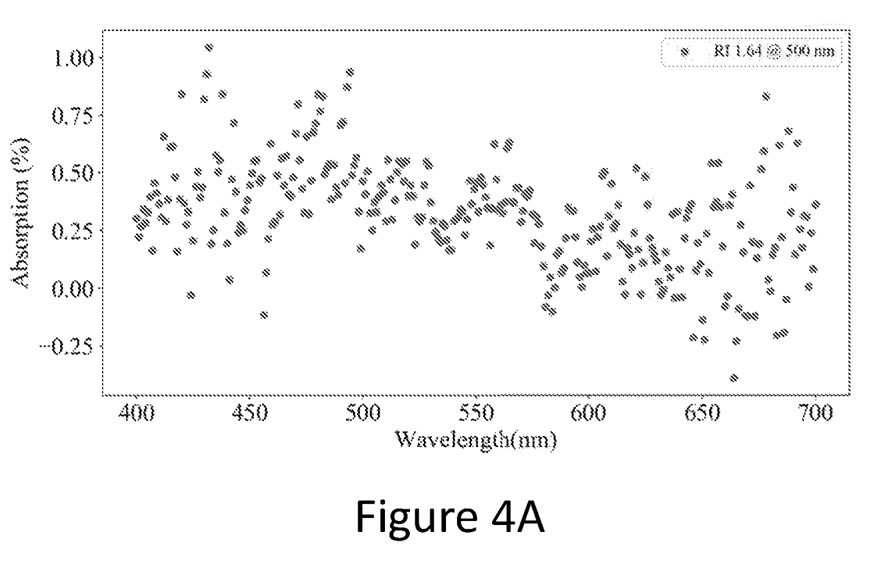
FIG. 4A is a plot showing the % absorption within the visible region of the electromagnetic spectrum, for an overcoat material formed using a cross-linker according to Formula I.
Figure 4B:
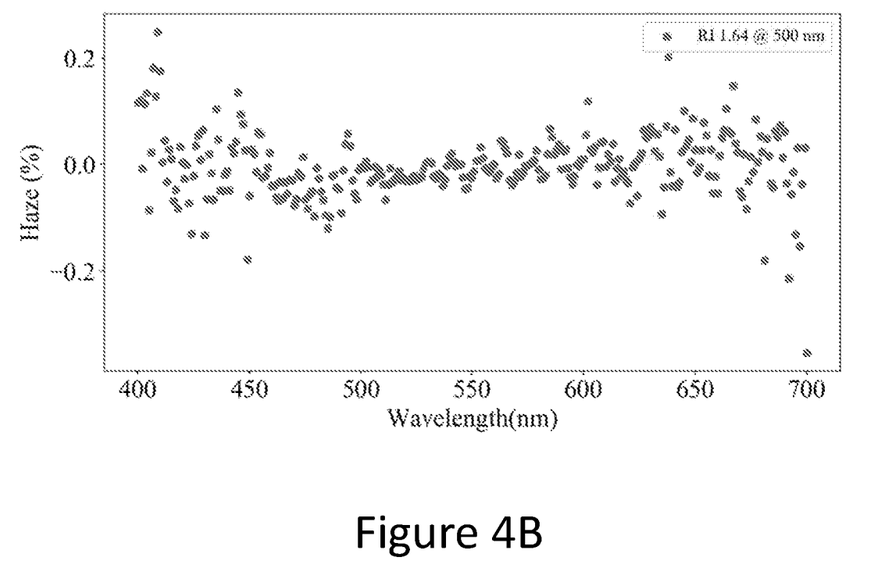
FIG. 4B is a plot showing the % haze within the visible region of the EM spectrum, for an overcoat material formed using a cross-linker according to Formula I.
Figure 5A:
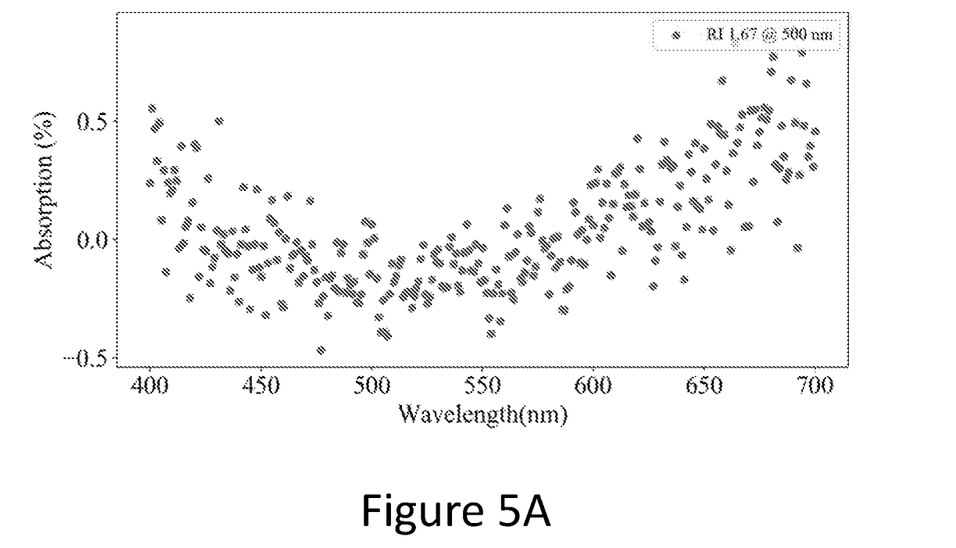
FIG. 5A is a plot showing the % absorption within the visible region of the electromagnetic spectrum, for an overcoat material formed using a cross-linker according to Formula II.
Figure 5B:
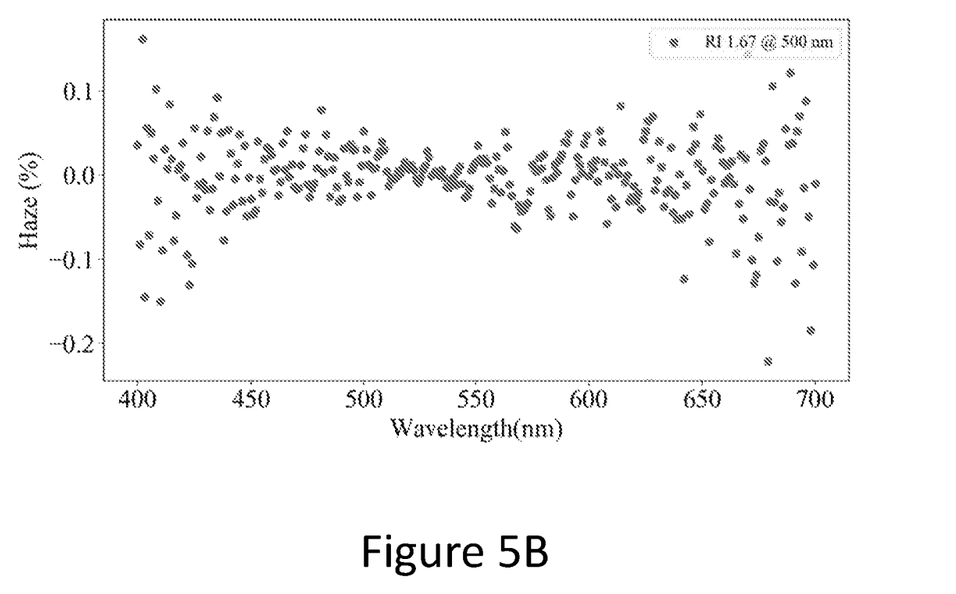
FIG. 5B is a plot showing the % haze within the visible region of the EM spectrum, for an overcoat material formed using a cross-linker according to Formula II.

The % absorption and % haze were measured for overcoat layers fabricated from precursor materials having Formula I and Formula II. FIG. 4A and FIG. 4B show plots of the % absorption vs. wavelength and % haze vs. wavelength, respectively, within the visible region of the electromagnetic (EM) spectrum (400 nm-700 nm), for an overcoat material formed from a precursor material corresponding to Formula I. Similarly, FIG. 5A and FIG. 5B show plots of the % absorption vs. wavelength and % haze vs. wavelength, respectively, within the visible region of the electromagnetic (EM) spectrum (400 nm-700 nm), for an overcoat material formed from a precursor material having Formula II. In both cases, the measured % absorption and % haze fall within the ranges discussed above. In particular, the % absorption is less than about 1% and the % haze is less than 0.2% in each case. As will be apparent, % absorption and % haze values are lower for the overcoat material that is fabricated from the precursor material having Formula II compared to the overcoat material that is fabricated from the precursor material having Formula I.

Compounds having epoxide functional groups, which have been discussed above with reference to specific examples, are merely one type of suitable overcoat precursor material. A variety of other cross-linkable chemical systems may be used instead, including but not limited to the following examples:

Nanoparticle loaded formulations, such as for instance UV curable nanoparticle zirconia ($ZnO_2$), are another class of materials suitable for use as the overcoat material. Nanoparticle zirconia materials have high transparence toward the blue-end of the EM spectrum, high Abbe number and therefore low wavelength dependence and good reliability.

An alcohol with a photolabile group in a solution with Powderlink 1174™ (Tetrakis(methyoxymethyl)glycoluril cross-linking agent).

Photopolymeric photoresist is a well-known type of photoresist, usually used for negative photoresist, which is yet another class of materials that is suitable for use as the overcoat material. Solutions containing acrylate (e.g., methyl methacrylate) or other suitable monomers and oligomers, and possibly an appropriate sensitizer, may be polymerized upon exposure to e.g. ultraviolet light to form the overcoat material.

Off-Stoichiometry Thiol-Enes (OSTE) polymers are yet another class of materials suitable for use as the overcoat material. OSTE polymers comprise off-stoichiometry blends of thiols and allyls. After complete polymerization, typically by UV micromolding, the polymer articles contain a well-defined number of unreacted thiol or allyls groups both on the surface and in the bulk. Epoxy monomers may be added to form ternary thiol-ene-epoxy monomer systems (OSTE+), where the epoxy in a second step reacts with the excess of thiols creating a final polymer article that is completely inert.

Vinyl ether may also be used to form the overcoat material, but it is more difficult to use compared to the other examples discussed above.

EXAMPLES 1-4

The following specific and non-limiting examples describe synthesis conditions that were used to produce overcoat layers using the precursor materials having Formula I, Formula II and Formula III.

Example 1—Formulation of Photoimageable Overcoat Using 9,9-Bis(4-glycidyloxyphenyl)fluorene (BGPF) (Formula I)

0.5 g of BGPF was dissolved in 4.5 g of propylene glycol monomethyl ether acetate (PGMEA) in a 10 ml glass vial equipped with a magnetic stir bar. To this solution was added 5 wt % (with respect to BGPF) of triarylsulonium hexafluorophosphate salts (a photoactivated acidic catalyst for ring-opening polymerization) in propylene carbonate (a polar, aprotic solvent). The resulting solution was spin coated on an unprimed Si wafer substrate at 1500 RPM for 30 seconds and baked at 110° C. for 60 seconds to remove the solvent. The film was then partially exposed to broadband UV-light for 60 seconds followed by post exposure bake (PEB) at 150° C. for 60 seconds. The resulting film was then rinsed with PGMEA to remove the unexposed area. The refractive index of the patterned film was measured to be 1.64 at 500 nm.

Example 2—Synthesis of poly(2-vinylnaphthalene-r-glycidyl methacrylate) P(2VN-r-GMA) Copolymer (Formula II)

1.0 g (6.48 mmol) of 2-vinylnaphthalene (2VN), 0.10 g (0.72 mmol) of glycidyl methacrylate (GMA), 47.3 mg (0.288 mmol) of azobisisobutyronitrile (ABIN) and 10.0 g of toluene were added to a 3-neck 100 ml round bottom flask equipped with a magnetic stir bar, an condenser and a nitrogen inlet. The reaction mixture was purged with nitrogen for 10 min and placed in an oil bath at 70° C. for 18 hours. At the end of the reaction, the flask was allowed to cool to room temperature and the reaction mixture was precipitated in 200 ml of methanol. The polymer was collected in a frit funnel and dried under vacuum. The resulting polymer was re-dissolved in tetrahydrofuran (THF) and re-precipitated in methanol. This process was repeated twice to obtain a white polymer powder.

Example 3—Formulation of Photoimageable Overcoat with the Polymer of Example 2 (Formula II)

0.5 g of the polymer from Example 2 in 4.5 g of cyclohexanone was added to a 10 ml glass vial equipped with a magnetic stir bar. To this solution was added 1 wt % (with respect to the polymer from Example 2) of triarylsulonium hexafluorophosphate salts in propylene carbonate. The resulting solution was spin coated on an unprimed Si wafer substrate at 1500 RPM for 30 seconds and baked at 110° C. for 60 seconds to remove the solvent. The film was then partially exposed to broadband UV-light for 60 seconds followed by a post exposure bake at 150° C. for 60 seconds. The resulting film was then rinsed with cyclohexanone to remove the unexposed area. The refractive index of the patterned film was measured to be 1.67 at 500 nm.

Example 4—Formulation of Photoimageable Overcoat with Glycidyl Polyhedral Oligomeric Silsesquioxane (GPOSS) (Formula III)

0.5 g of GPOSS (EP0409 from Hybrid Plastics) was dissolved in 4.5 g of PGMEA in a 10 ml glass vial equipped with a magnetic stir bar. To this solution was added 5 wt % (with respect to GPOSS) of triarylsulonium hexafluorophosphate salts in propylene carbonate. The resulting solution was spin coated on an unprimed Si wafer substrate at 1500 RPM for 30 seconds and baked at 110° C. for 60 seconds to remove the solvent. The film was then partially exposed to broadband UV-light for 60 seconds followed by post exposure bake (PEB) at 150° C. for 60 seconds. The resulting film was then rinsed with PGMEA to remove the unexposed area. The refractive index of the patterned film was measured to be 1.50 at 500 nm.

Figure 6A:
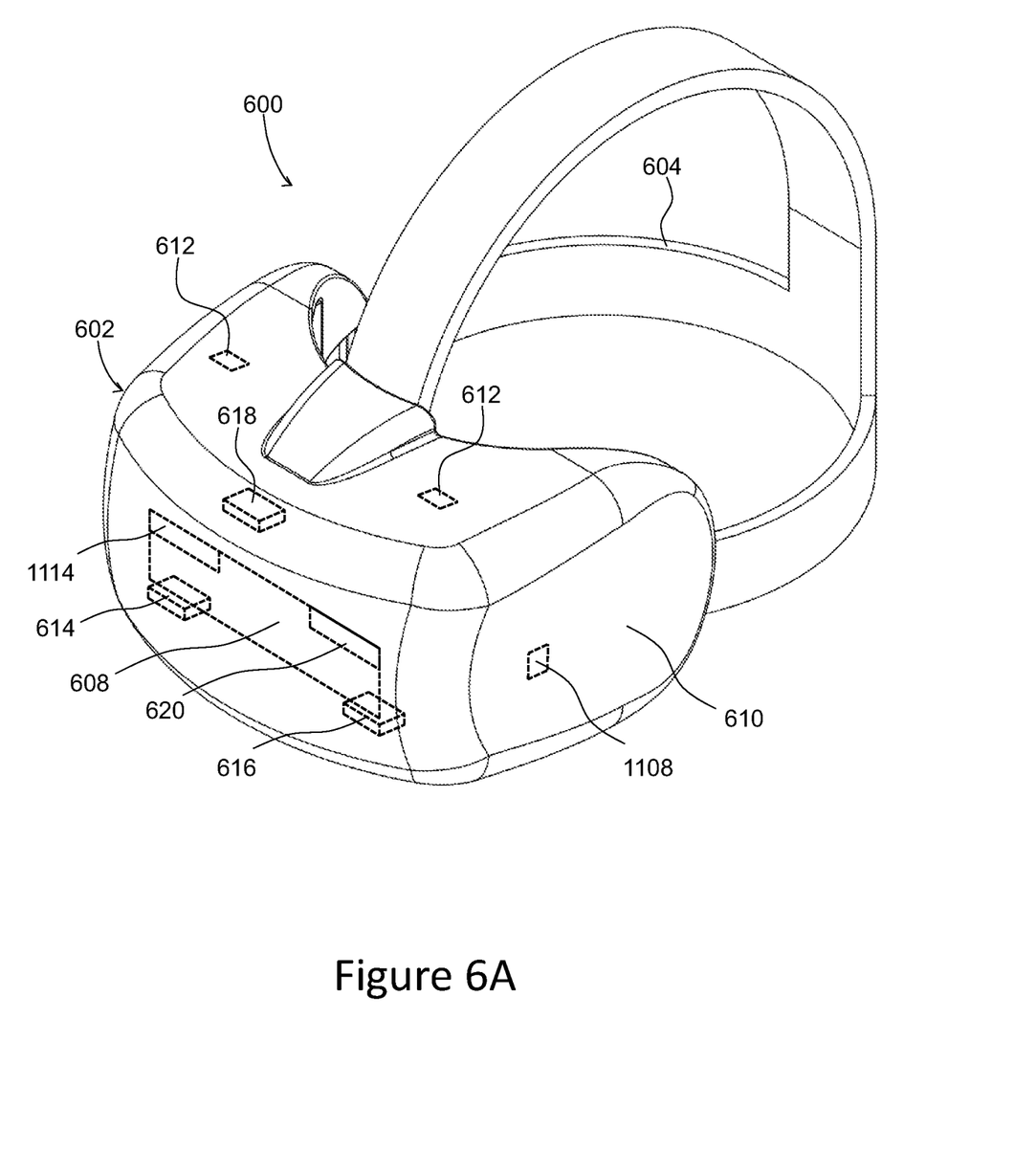
FIG. 6A is a perspective view of a representative augmented reality/virtual reality (AR/VR) wearable display system which encloses the user's face.

Referring now to FIG. 6A, shown is a perspective view of an HMD 600 that is suitable for use with the surface relief diffraction grating 100 or 150 having the layer of an overcoat material 114 disposed on top of and within the grooves of the output grating 108 and, if present, also on top of and within the grooves of the second grating 109. More particularly, HMD 600 is an example of an AR/VR wearable display system which encloses the user's face, for a greater degree of immersion into the AR/VR environment. The function of the HMD 600 is to augment views of a physical, real-world environment with computer-generated imagery, and/or to generate the entirely virtual 3D imagery. The HMD 600 may include a front body 602 and a band 604. The front body 602 is configured for placement in front of eyes of a user in a reliable and comfortable manner, and the band 604 may be stretched to secure the front body 602 on the user's head. A display system 608 may be disposed in the front body 602 for presenting AR/VR imagery to the user. Sides 610 of the front body 602 may be opaque or transparent.

In some embodiments, the front body 602 includes locators 612 and an inertial measurement unit (IMU) 614 for tracking acceleration of the HMD 600, and position sensors 616 for tracking position of the HMD 600. The IMU 614 is an electronic device that generates data indicating a position of the HMD 600 based on measurement signals received from one or more of position sensors 616, which generate one or more measurement signals in response to motion of the HMD 600. Examples of position sensors 616 include: one or more accelerometers, one or more gyroscopes, one or more magnetometers, another suitable type of sensor that detects motion, a type of sensor used for error correction of the IMU 614, or some combination thereof. The position sensors 616 may be located external to the IMU 614, internal to the IMU 614, or some combination thereof.

The locators 612 are traced by an external imaging device of a virtual reality system, such that the virtual reality system can track the location and orientation of the entire HMD 600. Information generated by the IMU 614 and the position sensors 616 may be compared with the position and orientation obtained by tracking the locators 612, for improved tracking accuracy of position and orientation of the HMD 600. Accurate position and orientation is important for presenting appropriate virtual scenery to the user as the latter moves and turns in 3D space.

The HMD 600 may further include a depth camera assembly (DCA) 618, which captures data describing depth information of a local area surrounding some or all of the HMD 600. To that end, the DCA 618 may include a laser radar (LIDAR), or a similar device. The depth information may be compared with the information from the IMU 614, for better accuracy of determination of position and orientation of the HMD 600 in 3D space.

The HMD 600 may further include an eye tracking system 620 for determining orientation and position of user's eyes in real time. The obtained position and orientation of the eyes also allows the HMD 600 to determine the gaze direction of the user and to adjust the image generated by the display system 608 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers (not shown) built into the front body 602.

Figure 6B:
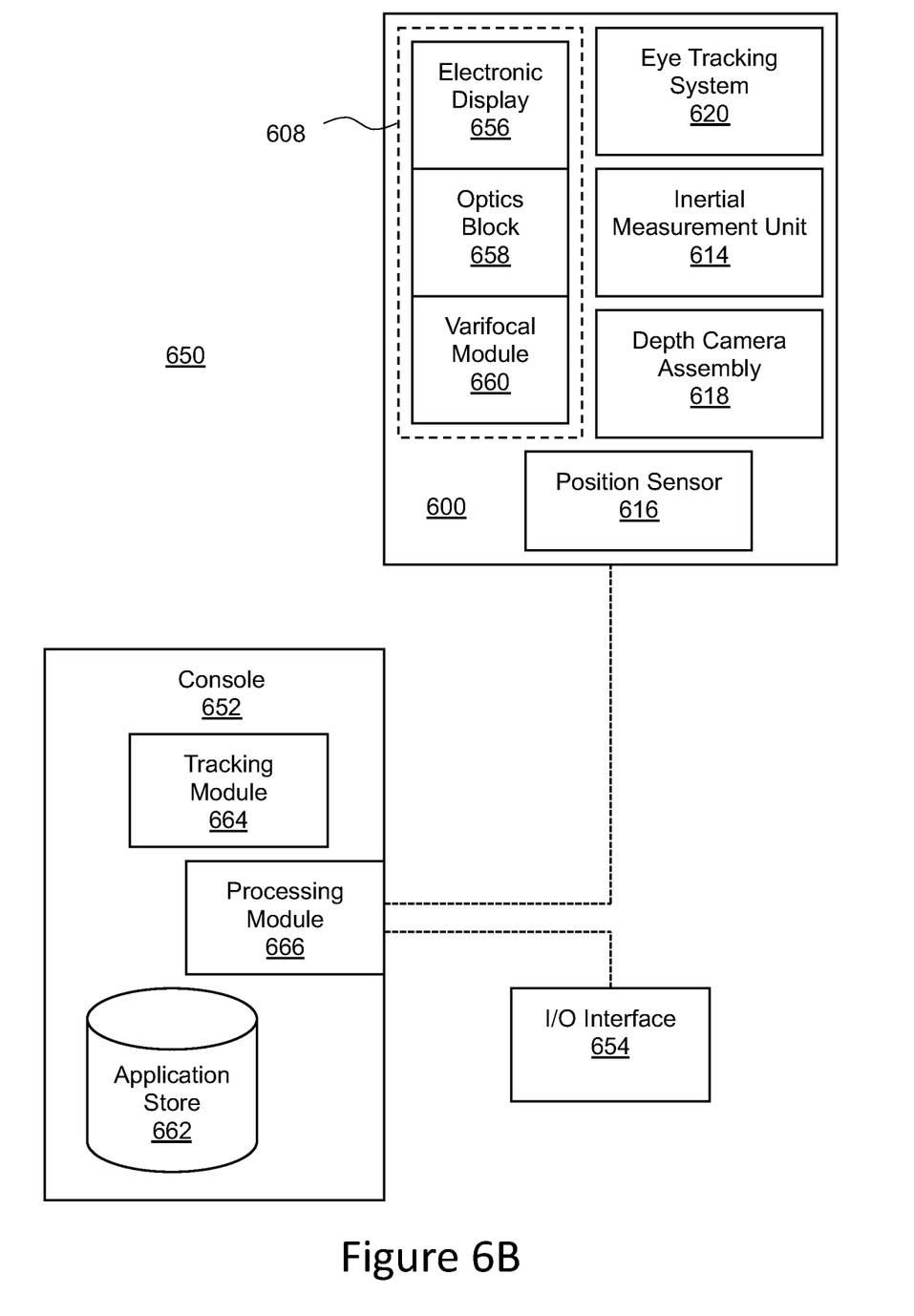
FIG. 6B is a simplified block diagram of the representative AR/VR system of FIG. 6A.

Referring to FIG. 6B, an AR/VR system 650 includes the HMD 600 of FIG. 6A, an external console 652 storing various AR/VR applications, setup and calibration procedures, 3D videos, etc., and an input/output (I/O) interface 654 for operating the console 652 and/or interacting with the AR/VR environment. The HMD 600 may be "tethered" to the console 652 with a physical cable, or connected to the console 652 via a wireless communication link such as Bluetooth®, Wi-Fi, etc. There may be multiple HMDs 600, each having an associated I/O interface 654, with each HMD 600 and I/O interface(s) 654 communicating with the console 652. In alternative configurations, different and/or additional components may be included in the AR/VR system 650. Additionally, functionality described in conjunction with one or more of the components shown in FIGS. 6A and 6B may be distributed among the components in a different manner than described in conjunction with FIGS. 6A and 6B in some embodiments. For example, some or all of the functionality of the console 652 may be provided by the HMD 600, and vice versa. The HMD 600 may be provided with a processing module capable of achieving such functionality.

As described above with reference to FIG. 6A, the HMD 600 may include the eye tracking system 620 (FIG. 6B) for tracking eye position and orientation, determining gaze angle and convergence angle, etc., the IMU 614 for determining position and orientation of the HMD 600 in 3D space, the DCA 618 for capturing the outside environment, the position sensor 616 for independently determining the position of the HMD 600, and the display system 608 for displaying AR/VR content to the user. The display system 608 includes (FIG. 6B) an electronic display 656. The display system 608 further includes an optics block 658, whose function is to convey the images generated by the electronic display 656 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, for example the waveguide 100 of FIG. 1A or 150 of FIG. 1B, including the grating structures and coatings described herein. The display system 608 may further include a varifocal module 660, which may be a part of the optics block 658. The function of the varifocal module 660 is to adjust the focus of the optics block 658 e.g. to compensate for vergence-accommodation conflict, to correct for vision defects of a particular user, to offset aberrations of the optics block 658, etc.

The I/O interface 654 is a device that allows a user to send action requests and receive responses from the console 652. An action request is a request to perform a particular action. For example, an action request may be an instruction to start or end capture of image or video data or an instruction to perform a particular action within an application. The I/O interface 654 may include one or more input devices, such as a keyboard, a mouse, a game controller, or any other suitable device for receiving action requests and communicating the action requests to the console 652. An action request received by the I/O interface 654 is communicated to the console 652, which performs an action corresponding to the action request. In some embodiments, the I/O interface 654 includes an IMU that captures calibration data indicating an estimated position of the I/O interface 654 relative to an initial position of the I/O interface 654. In some embodiments, the I/O interface 654 may provide haptic feedback to the user in accordance with instructions received from the console 652. For example, haptic feedback can be provided when an action request is received, or the console 652 communicates instructions to the I/O interface 654 causing the I/O interface 654 to generate haptic feedback when the console 652 performs an action.

The console 652 may provide content to the HMD 600 for processing in accordance with information received from one or more of: the IMU 614, the DCA 618, the eye tracking system 620, and the I/O interface 654. In the example shown in FIG. 6B, the console 652 includes an application store 662, a tracking module 664, and a processing module 666. Some embodiments of the console 652 may have different modules or components than those described in conjunction with FIG. 6B. Similarly, the functions further described below may be distributed among components of the console 652 in a different manner than described in conjunction with FIGS. 6A and 6B.

The application store 662 may store one or more applications for execution by the console 652. An application is a group of instructions that, when executed by a processor, generates content for presentation to the user. Content generated by an application may be in response to inputs received from the user via movement of the HMD 600 or the I/O interface 654. Examples of applications include: gaming applications, presentation and conferencing applications, video playback applications, or other suitable applications.

The tracking module 664 may calibrate the AR/VR system 650 using one or more calibration parameters and may adjust one or more calibration parameters to reduce error in determination of the position of the HMD 600 or the I/O interface 654. Calibration performed by the tracking module 664 also accounts for information received from the IMU 614 in the HMD 600 and/or an IMU included in the I/O interface 654, if any. Additionally, if tracking of the HMD 600 is lost, the tracking module 664 may re-calibrate some or all of the AR/VR system 650.

The tracking module 664 may track movements of the HMD 600 or of the I/O interface 654, the IMU 614, or some combination thereof. For example, the tracking module 664 may determine a position of a reference point of the HMD 600 in a mapping of a local area based on information from the HMD 600. The tracking module 664 may also determine positions of the reference point of the HMD 600 or a reference point of the I/O interface 654 using data indicating a position of the HMD 600 from the IMU 614 or using data indicating a position of the I/O interface 654 from an IMU included in the I/O interface 654, respectively. Furthermore, in some embodiments, the tracking module 664 may use portions of data indicating a position or the HMD 600 from the IMU 614 as well as representations of the local area from the DCA 618 to predict a future location of the HMD 600. The tracking module 664 provides the estimated or predicted future position of the HMD 600 or the I/O interface 654 to the processing module 666.

The processing module 666 may generate a 3D mapping of the area surrounding some or all of the HMD 600 ("local area") based on information received from the HMD 600. In some embodiments, the processing module 666 determines depth information for the 3D mapping of the local area based on information received from the DCA 618 that is relevant for techniques used in computing depth. In various embodiments, the processing module 666 may use the depth information to update a model of the local area and generate content based in part on the updated model.

The processing module 666 executes applications within the AR/VR system 650 and receives position information, acceleration information, velocity information, predicted future positions, or some combination thereof, of the HMD 600 from the tracking module 664. Based on the received information, the processing module 666 determines content to provide to the HMD 600 for presentation to the user. For example, if the received information indicates that the user has looked to the left, the processing module 666 generates content for the HMD 600 that mirrors the user's movement in a virtual environment or in an environment augmenting the local area with additional content. Additionally, the processing module 666 performs an action within an application executing on the console 652 in response to an action request received from the I/O interface 654 and provides feedback to the user that the action was performed. The provided feedback may be visual or audible feedback via the HMD 600 or haptic feedback via the I/O interface 654.

In some embodiments, based on the eye tracking information (e.g., orientation of the user's eyes) received from the eye tracking system 620, the processing module 666 determines resolution of the content provided to the HMD 600 for presentation to the user on the electronic display 656. The processing module 666 may provide the content to the HMD 600 having a maximum pixel resolution on the electronic display 656 in a foveal region of the user's gaze. The processing module 666 may provide a lower pixel resolution in other regions of the electronic display 656, thus lessening power consumption of the AR/VR system 650 and saving computing resources of the console 652 without compromising a visual experience of the user. In some embodiments, the processing module 666 can further use the eye tracking information to adjust where objects are displayed on the electronic display 656 to prevent vergence-accommodation conflict and/or to offset optical distortions and aberrations.

In the present disclosure, it is understood that a word appearing in the singular encompasses its plural counterpart, and a word appearing in the plural encompasses its singular counterpart, unless implicitly or explicitly understood or stated otherwise. For instance, unless the context indicates otherwise, a singular reference, such as "a" or "an" means "one or more". Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. It is also to be understood, where appropriate, like reference numerals may refer to corresponding parts throughout the several views of the drawings for simplicity of understanding.

Throughout the description and claims of this specification, the words "comprise", "including", "having" and "contain" and variations of the words, for example "comprising" and "comprises" etc., mean "including but not limited to", and are not intended to (and do not) exclude other components.

It will be appreciated that variations to the foregoing embodiments of the disclosure can be made while still falling within the scope of the disclosure. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language ("for instance", "such as", "for example", "e.g." and like language) provided herein, is intended merely to better illustrate the disclosure and does not indicate a limitation on the scope of the disclosure unless otherwise claimed.

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the disclosure are applicable to all aspects of the disclosure and may be used in any combination. Likewise, features described in non-essential combinations may be used separately (not in combination).

What is claimed is:

1. An imaging waveguide comprising:
   a substrate for guiding image light therein by total internal reflection (TIR);
   an input grating supported by the substrate for coupling the image light into the imaging waveguide;
   a first output grating supported by the substrate and spaced apart from the input grating for coupling the image light guided in the substrate out of the imaging waveguide for observation by a user; and a gap filling overcoat formed on and within the first output grating but not on or within the input grating, such that rainbow effects in the first output grating are reduced due to the presence of the gap filling overcoat, while a diffraction efficiency of the input grating is preserved due to the lack of the gap filling overcoat.

2. The imaging waveguide of claim 1, further comprising a second output grating supported by the substrate opposite the first output grating, for redirecting the image light, wherein the gap filling overcoat is further formed on and within the second output grating.

3. The imaging waveguide of claim 1, wherein the substrate is a plano-parallel substrate.

4. The imaging waveguide of claim 1, wherein the overcoat comprises a material characterized by a refractive index between 1.40 and 1.80 at a wavelength of 500 nm.

5. The imaging waveguide of claim 4, wherein the material is further characterized by less than 1% haze for electromagnetic radiation within the wavelength range between 400 nm and 700 nm.

6. The imaging waveguide of claim 4, wherein the material is further characterized by less than 1% absorption of electromagnetic radiation within the wavelength range between 400 nm and 700 nm.

7. The imaging waveguide of claim 1, wherein the first output grating comprises a surface-relief diffraction grating.

8. The imaging waveguide of claim 1, wherein the overcoat comprises a material formed by cross-linking an overcoat precursor material comprising an organic compound having an epoxide functional group.

9. The imaging waveguide of claim 1, wherein the overcoat comprises a material formed by cross-linking an overcoat precursor material comprising UV curable zirconia nanoparticles.

10. The imaging waveguide of claim 1, wherein the overcoat comprises a material formed by cross-linking an overcoat precursor material comprising a silisesquioxane moiety.

11. A process for forming an imaging waveguide for a visual display, comprising:
providing a substrate for guiding image light therein by total internal reflection (TIR), the substrate having an input grating supported thereby for coupling the image light into the imaging waveguide and having an output grating supported thereby and spaced apart from the input grating for coupling the image light guided in the substrate out of the imaging waveguide for observation by a user;
forming a layer of an overcoat precursor material on top of and within the output grating and on top of and within the input grating, the overcoat precursor material being a cross-linkable material;
selectively inducing cross-linking in the overcoat precursor material disposed on top of and within the output grating to produce a cross-linked material, but not the overcoat precursor material disposed on top of and within the input grating; and
removing overcoat precursor material other than the cross-linked material, such that a gap filling overcoat is formed on and within the output grating but not on or within the input grating, and such that rainbow effects in the output grating are reduced due to the presence of the gap filling overcoat, while a diffraction efficiency of the input grating is preserved due to the lack of the gap filling overcoat.

12. The process of claim 11, wherein removing overcoat precursor material other than the cross-linked material comprises using a solvent to rinse overcoat precursor material from on top of and within the input grating.

13. The process of claim 11, wherein selectively inducing cross-linking in the precursor material disposed on top of and within the output grating comprises:
masking the overcoat precursor material disposed on top of and within the input grating; and
irradiating the masked optical component with electromagnetic radiation.

14. The process of claim 13, wherein the electromagnetic radiation is ultraviolet (UV) radiation.

15. The process of claim 11, wherein the input grating and the output grating are slant gratings and wherein the layer of the overcoat precursor material is formed by spin coating an overcoat formulation which comprises the overcoat precursor material, a solvent, and an initiator.

16. The process of claim 11, wherein the overcoat precursor material is an organic material having an epoxide functional group, and wherein forming a layer of an overcoat precursor material comprises spin coating a solution containing the organic material.

17. The process of claim 11, wherein the overcoat precursor material comprises nanoparticles, and wherein forming a layer of an overcoat precursor material comprises spin coating a solution containing the nanoparticles.

18. The process of claim 17, wherein the nanoparticles are UV curable zirconia nanoparticles.

19. The process of claim 11, wherein the overcoat material comprises a silisesquioxane moiety, and wherein forming a layer of an overcoat precursor material comprises spin coating a solution containing the silisesquioxane moiety.

* * * * *